(12) United States Patent
Boneschanscher et al.

(10) Patent No.: US 7,946,771 B2
(45) Date of Patent: May 24, 2011

(54) CAMERA SUPPORT AND RESPECTIVE CAMERA ASSEMBLY

(75) Inventors: Machiel Boneschanscher, Best (NL);
Victor Moerdijk, Eindhoven (NL);
Jeffrey Dam, Roosendaal (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 250 days.

(21) Appl. No.: 11/921,913

(22) PCT Filed: Jun. 12, 2006

(86) PCT No.: PCT/EP2006/063099
§ 371 (c)(1),
(2), (4) Date: Feb. 3, 2009

(87) PCT Pub. No.: WO2006/134091
PCT Pub. Date: Dec. 21, 2006

(65) Prior Publication Data
US 2009/0220225 A1      Sep. 3, 2009

(30) Foreign Application Priority Data

Jun. 13, 2005 (EP) .................................... 05300476
Jul. 13, 2005 (EP) .................................... 05300586

(51) Int. Cl.
*G03B 17/00* (2006.01)
(52) U.S. Cl. .................................... 396/419; 248/187.1
(58) Field of Classification Search .................. 396/419, 396/428, 544; 348/373, 376; 248/187.1, 248/346.03, 673, 680–681
See application file for complete search history.

(56) References Cited

U.S. PATENT DOCUMENTS

| | | | | |
|---|---|---|---|---|
| 4,653,709 A * | 3/1987 | Paldino | ....................... | 248/183.2 |
| 5,349,411 A * | 9/1994 | Beauviala | ..................... | 396/544 |
| 5,444,507 A * | 8/1995 | Palmer | .......................... | 396/421 |
| 5,870,641 A * | 2/1999 | Chrosziel | ..................... | 396/425 |
| 6,196,504 B1 * | 3/2001 | Lemke | ........................ | 248/187.1 |
| 6,791,769 B2 * | 9/2004 | Takeda | .......................... | 359/819 |
| 7,720,368 B2 * | 5/2010 | Hurd | ................................ | 396/71 |
| 2004/0195466 A1 * | 10/2004 | Ma | ................................. | 248/68.1 |
| 2007/0290103 A1 * | 12/2007 | Muller | ...................... | 248/187.1 |

FOREIGN PATENT DOCUMENTS

EP      1351093      10/2003

OTHER PUBLICATIONS

"Web." The American Heritage® Dictionary of the English Language. Boston: Houghton Mifflin, 2007. Credo Reference. Web. Jul. 7, 2010.*
Search Report Dated Jul. 31, 2006.

* cited by examiner

*Primary Examiner* — Clayton E Laballe
*Assistant Examiner* — Leon W Rhodes
(74) *Attorney, Agent, or Firm* — Arent Fox LLP

(57) ABSTRACT

A camera support comprises a baseplate on which first and second engaging means are formed for releasably engaging first and second portions of a camera body displaced along the baseplate in an engaging direction. The first engaging means defines an abutment position for the first portion of the camera body, and the second engaging means defines a space between two sidewalls for slidably receiving a web of second portion of the camera body, and wherein one of said sidewalls is displaceable towards the other and is coupled to a trigger of the first engaging means so as to clamp the web between the sidewalls when the trigger is operated by the first portion reaching the abutment position. A camera support of this kind can be used advantageously for a respective camera assembly, for example a superexpander.

17 Claims, 9 Drawing Sheets

CAMERA SUPPORT AND RESPECTIVE CAMERA ASSEMBLY

This application claims the benefit, under 35 U.S.C. §365 of International Application PCT/EP2006/063099, filed Jun. 12, 2006, which was published in accordance with PCT Article 21(2) on Dec. 21, 2006 in English and which claims the benefit of European patent application No. 05300476.8, filed Jun. 13, 2005 and European patent application No. 05300586.4, filed Jul. 13, 2005.

The present invention relates to a camera support for releasably mounting a camera, and a respective camera assembly. A known camera assembly in the field of television cameras is a so-called superexpander, which may be regarded as a kind of frame for mounting on a tripod or the like, and which bears a lens, and to which different types of camera bodies may be releasably connected in order to cooperate with the lens.

A prior art super-expander comprises two orthogonal branches, a first one of which extends perpendicular to an optical axis of a lens mounted to it, and the second of which extends at a side of the first branch opposite to the side at which the lens is mounted and to which the camera body is releasably locked.

Conventionally, such a superexpander has a baseplate on which first and second engaging means are formed for releasably engaging front and rear portions of a camera body, and the camera body is displaceable from rear to front on the baseplate in order to be connected. The first engaging means (or front engaging means) is formed of two wedges, which define the sides of a tapered swallowtail groove, and which converge in the forward direction. The camera body has a tapered wedge of swallowtail cross section which may be pushed into said groove until the sides of the camera wedge touch those of the baseplate. In this way, an abutment position for the camera body is defined, beyond which it cannot move forward, and where it cannot move laterally or vertically, either. The second or rear engaging means are formed by a platelet which is held by a stem at a distance from the baseplate, and complementary engaging means of the camera comprise webs which engage between the baseplate and the platelet when the camera body is moved forward to its abutment position.

There must be some play between the platelet and the webs, in order to ensure that they can be freely engaged and disengaged. However, this play implies that there is some residual mobility in the rear portion of the camera body, even if the front portion thereof is in the abutment position. If the camera body can move with respect to the lens, so will the image projected by the lens with respect to the light sensitive surface of the camera body. In order to avoid this, a play-free fixture must be provided for the rear portion of the camera, too. Of course, additional tools might be provided for fixing the rear portion of the camera to the baseplate without play, but operating these tools is tedious, and there is a risk that the camera man forgets to use them.

Further, there is a risk of damaging the lens if the camera body is pushed towards the abutment position without being properly oriented with respect to the optical axis.

The object of the invention is to provide a camera support and a camera assembly which will lock a camera body in place without play automatically when it is moved into its intended mounting position, and which allows in particular a safe handling of the camera body with regard to the lens.

This object is achieved by a camera support comprising a baseplate on which first and second engaging means are formed for releasably engaging first and second portions of a camera body displaced along the baseplate in an engaging direction, wherein the first engaging means defines an abutment position for the first region of the camera, and the second engaging means defines a space between two sidewalls for slidably receiving a web of the camera, and wherein one of said sidewalls is displaceable towards the other and is coupled to a trigger of the first engaging means so as to clamp the web between the sidewalls when the trigger is operated by the first region reaching the abutment position.

The camera support preferably comprises a first spring for urging the sidewalls away from each other, so that the web of the camera may be freely introduced into the space between them as long as the trigger is not operated.

One of said sidewalls may be formed by a flat outside surface of said baseplate, and the other sidewall may be formed by a locking plate which is held above said flat surface by a stem extending through a bore of said flat surface.

In order to drive the clamping movement, a wedge may be located between a pressing surface of said stem and an inside surface of said baseplate, so that when the wedge is thrust farther into the space between the pressing surface and the inside surface of the baseplate, the locking plate is pulled towards the outside surface of the baseplate.

In order to apply a well balanced pulling force to the stem, the stem may extend through a slot of the wedge, and the pressing surface may be formed on a plate that extends sideways from said stem.

A second spring may be provided for urging the wedge towards a position in which the stem is withdrawn into the baseplate, so that no external driving force is required for withdrawing the stem.

For coupling the wedge to the trigger of the first engaging means, the wedge is preferably arranged to be displaceable transversally with respect to the displacement direction of the camera body, and the trigger releasably engages a spring-loaded latch, which is also displaceable transversally with respect to the displacement direction, and the wedge is coupled to the latch by a two-armed lever extending in the displacement direction.

A camera support of this kind can be used advantageously for a respective camera assembly. The camera assembly comprises a camera support with two orthogonal branches, a first of which is adapted to support a lens, and a second of which has first locking means for releasably locking a camera body to the second branch, in which said second branch has an immobile member with respect to the first branch and a displaceable member which is displaceable with respect to the immobile member along a predefined trajectory, said first locking means are formed in said displaceable member which is displaceable between a first position in which said camera body, when locked to the displaceable member by said first locking means, is spaced from the lens, and a second position in which the camera body connects to the lens. The displaceable member corresponds with the baseplate of the camera support, as described before.

Since in this camera assembly, the camera body is locked to the support while the displaceable member is in its first position, there is no risk of contact between the camera body and a lens which may be mounted to the first branch, even if the camera is pushed violently towards its abutment position without being properly oriented. There is no risk that the abutment position cannot be reached because due to manufacturing tolerances the camera body hits the first branch before, or that the bayonet connection is difficult to close because the camera body in the abutment position is too far apart from the first branch.

As a first safety measure, it can be provided that the displaceable member is displaceable into the second position only if the locking means is in a locking configuration. Thus the camera body can approach the lens only if its orientation is correct, and there is no risk of a contact between the camera body and an optical surface of the lens.

This first safety measure may in particular be embodied by an operating member of said locking means which is displaceable perpendicular to the displacement direction of said displaceable member and which may be displaced by a user for locking and/or unlocking the camera body, and by said immobile member having a projection which blocks the operating member in its locking configuration when the displaceable member is in the second position.

As a second safety measure, it can be provided that the locking means is locked in the locking configuration when the displaceable member is in the second position. I.e. the camera body cannot be unlocked from the displaceable member while it is so close to the lens that an accidental movement of the camera body might damage the lens.

This first safety measure may in particular be embodied by an operating member of said locking means which is displaceable perpendicular to the displacement direction of said displaceable member and which may be displaced by a user for locking and/or unlocking the camera body, and by said immobile member having a projection which blocks the displaceable member in its first position when the locking means is in a non-locking configuration.

It is particularly preferred that both safety measures be implemented, and that the operating member and the projection of the two safety measures be the same. This may be achieved e.g. by providing the operating member with a first blocking surface which extends substantially perpendicular to the displacement direction of the displaceable member, which faces a first side of the projection of the immobile member while in the non-locking configuration and which does not overlap said first blocking surface when the operating member is in the locking configuration, and with a second blocking surface which is substantially perpendicular to the direction of displacement of said operating member between its locking and non-locking configurations, and which overlaps with a second side of said projection only if the displaceable member is in its second position.

The camera body and the displaceable member should preferably have co-operating guide means for guiding the camera body into a position in which the locking means are capable of locking the camera body to the displaceable member. These co-operating guide means may comprise a tapered wedge and a mating tapered swallow-tail groove, one of which is located at the camera body and the other of which is located at the displaceable member, e.g. as described above. In addition or as an alternative, co-operating webs and grooves of constant width may be provided at the displaceable member and at the camera body, for strictly guiding a linear displacement of the camera body with respect to the support.

The guide means may guide the camera body into its locking position in parallel to the displacement direction of the displaceable member; since according to the above safety measures the displaceable member is blocked while in the non-locking configuration, there is no risk of the camera body hitting the lens without being properly locked, and, hence, properly oriented.

The displaceable member may be displaceable into a third position in which it farther away from the first branch than in the first and second positions, and in which it is unlocked from the immobile member. In this position, it is possible to remove the displaceable member from the support, e.g. for repair or maintenance purposes.

Second locking means may be provided for automatically and releasably locking the displaceable member to the immobile member when the displaceable member is displaced from its first position to its second position, thus preventing the camera body from coming closer to the lens than necessary for connecting the two.

The camera assembly allows therefore to lock the camera body to the support in a well-defined position and to connect the camera body to the lens without having to impose too strict tolerances on placing and dimensions of the various components that co-operate in the connection between camera body and lens. There is further no risk of damaging the lens when the camera body is approached to it.

Further features and advantages of the invention will become apparent from the subsequent description of embodiments thereof, referring to the appended drawings.

Figure 1:
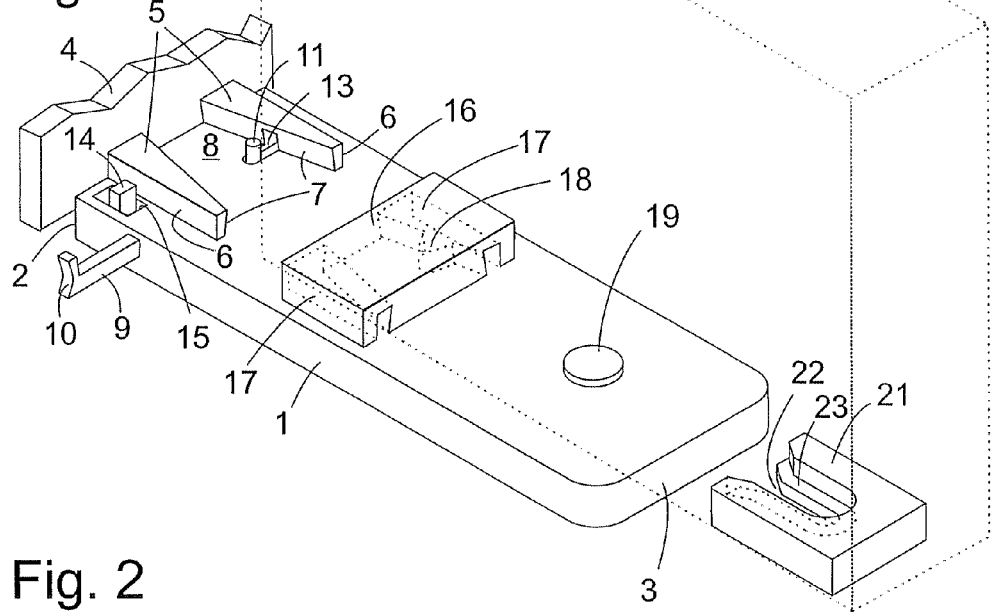
FIG. 1 is a perspective view of a camera support and of complementary engaging means of a camera for cooperating with the engaging means of the camera support.

The general configuration of the camera support will be explained referring to FIG. 1. Like a conventional superexpander, the support comprises a baseplate 1 and a vertical wall 4 which is faced by a front end 2 of baseplate 1 and to an upper portion of which a lens, not shown, is mounted. In the FIG. 1, only a lower portion of wall 4 is depicted. The baseplate 1 is a flat slab made of aluminum or the like.

Near the front end 2, two wedges 5 are formed on the baseplate 1. The wedges 5 have vertical outer sides 6 extending in a longitudinal direction of the baseplate 1 and inner sides 7 which face each other and converge in upward and frontward directions, so as to define a wide tapered groove 8 having a swallow-tail cross section.

Underneath the wedges 5, a latch 9 is slideably received in a transversal slot of the baseplate 1. At a remote end of the latch 9, a concave surface 10 is formed, which is easily pressed with a finger, in order to push the latch 9 into the baseplate 1. The latch 9 is connected to a cylindrical pin 11 which protrudes through an elongated hole 13 at the bottom of tapered groove 8. The elongated hole 13 extends into one of the wedges 5, so that when the latch 9 is pressed, the pin 11 moves out of the groove 8 and disappears in the opening of the wedge.

Adjacent to the outer side 6 of one of the wedges 5, a trigger pawl 14 is mounted in a hole 15 of the baseplate 1. The trigger pawl 14 is displaceable in the longitudinal direction of the baseplate 1.

Near the centre of the baseplate 1, a cuboid block 16 is shown, which forms engaging means of the camera body. The camera body is shown in phantom in the figure in order to illustrate its position with respect to the block 16. At the bottom side of the block 16, two tapered grooves 17 are formed, the shape of which matches the wedges 5 of the baseplate. Since the grooves 17 have wide openings at the side of the block 16 which faces the wedges 5, it is easy to make the wedges 5 engage the grooves 17 when the camera body is pushed towards the wall 4 in order to prepare for coupling it to the lens. The camera body can be pushed forward until an abutment position is reached in which the inner sides of the groove 17 touch the inner sides 7 of the wedges 5. When this happens, a notch 18 formed in an inner side of one of the grooves 17 is aligned with the elongated hole 13, so that pin 11 can engage it and come into contact with a front wall of the notch 18, thereby preventing a rearward movement of the block 16. The position of block 16 is thus defined without any play.

Near the rear end 3 of the baseplate 1, a circular locking plate 19 is held spaced from the upper side of the baseplate 1 by a cylindrical stem 20 (see e.g. FIG. 5) which, in the view of FIG. 1, is concealed completely below the locking plate 19.

The camera body has a shoe plate 21 fixed to its rear bottom portion, in which an undercut groove 22 is formed. In its upper portion, the groove 22 is wide enough to receive the locking plate 19, whereas in a lower portion thereof, webs 23 protrude from the sides of the groove towards the centre in order to engage between the locking plate 19 and the surface of the baseplate 1 at both sides of the stem 20.

In the configuration of the support shown in FIG. 1, a camera body would be locked to the support, if appropriately placed with its block 16 engaging the groove 8, the pin 11 engaging the notch 18 and the locking plate 19 engaging the groove 22 of shoe plate 21.

Figure 4:
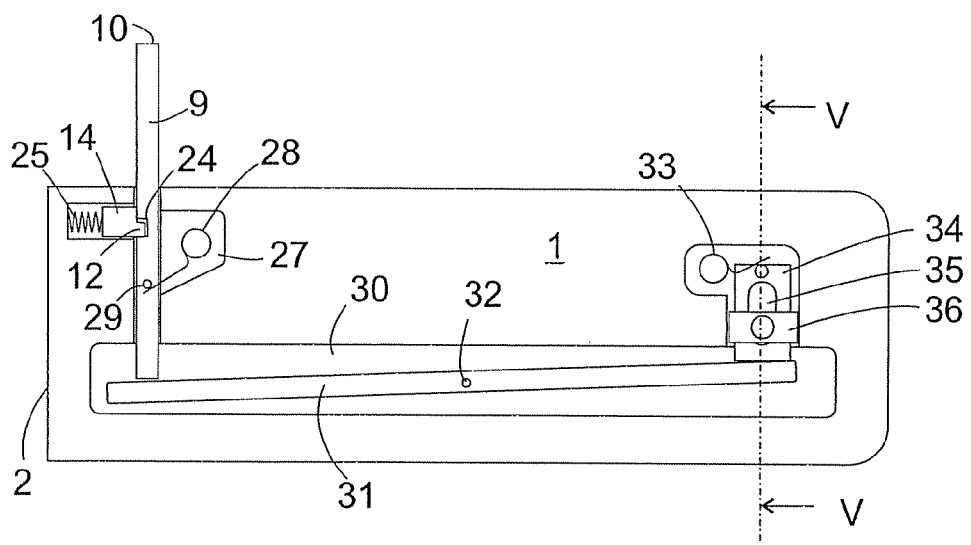
FIG. 4 is a bottom view of the mounting plate in unlocked configuration.
Figure 5:
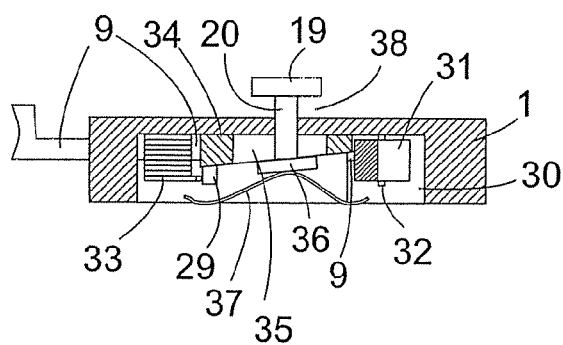
FIG. 5 is a cross section along line V-V of FIG. 4.

In order to understand the process of locking the camera body to the support, reference will now be made to FIGS. 4 and 5, which show a bottom view of the baseplate 1 and a cross section of it in a non-locking configuration. In this configuration, the latch 9 is pressed into the baseplate 1, so that pin 11 is hidden within the wedge 5. A cog 12, which is part of trigger pawl 14, engages a notch 24 of latch 9. The cog 12 is held pressed into the notch 24 by a compressed helical spring 25. Another helical spring 26 is mounted in a cutout 27 and is under a torsion load, so that an end branch 28 of spring 26 applies a force to a catch 29 of latch 9 which tends to push latch 9 out of the baseplate 1. The latch 9, being blocked by cog 12, cannot yield to this force.

In a longitudinal cutout 30 of the baseplate 1, a two-armed lever 31 is rotatably held on a shaft 32. A wedge 34 is pressed against one end of the lever 31 by a third helical spring 33, whereby the other end of the lever 31 is pressed against the inner end of latch 9. The wedge 34 has a longitudinal slot 35 formed in it, through which the stem 20 extends. A pressing plate 36 extending across the wedge 34 is fixed to an end of the stem 20. A leaf spring 37, which is not shown in FIG. 4 for the sake of clarity, but in FIG. 5 only, urges the plate 36 against the wedge 34, so that the wedge 34 is held without play between the plate 36 and an inner surface of baseplate 1. In the configuration of FIG. 5, the space 38 between the upper surface of baseplate 1 and the bottom side of locking plate 19 is wide enough for the webs 23 of shoe plate 21 to engage in it easily.

In the process of pushing the camera body forward from the position shown in FIG. 1 to the position in which it is to be locked, the block 16 hits trigger pawl 14 and pushes it towards front end 2, whereby spring 25 is compressed and cog 12 is removed from notch 24. Now, the latch 9 can yield to the force of spring 26 and move outward. The lever 31 is now free to rotate about shaft 32, so that it yields to the pressure of the wedge 34, the wedge 34 is moved downward in the perspective of FIG. 4 or to the right in the perspective of FIG. 5, thus pulling locking plate 19 towards baseplate 1.

Figure 2:
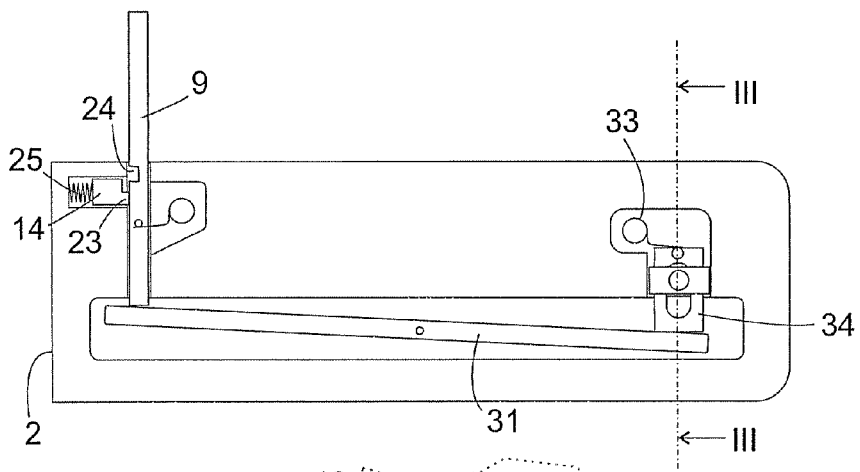
FIG. 2 is a bottom view of the support of FIG. 1.
Figure 3:
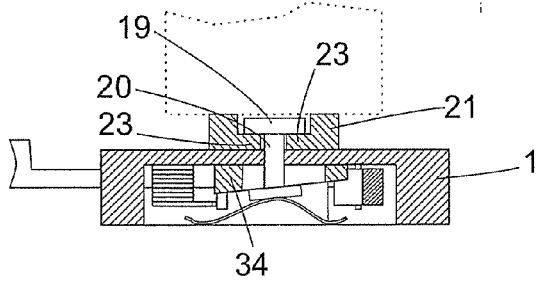
FIG. 3 is a cross section of the support taken along line III-III of FIG. 2.

The resulting configuration can be seen in FIGS. 2 and 3. The wedge 34 yields to the force of spring 33, until the locking plate 19 is drawn so close to the baseplate 1 that the webs 23 of shoe plate 21 are clamped between baseplate 1 and locking plate 19. Since the slope of the wedge 34 is small—the thickness difference between its thick and narrow ends may be less than 0.5 mm, whereas the distance between its two positions in the configurations of FIGS. 2 and 4 may be several millimetres the wedge 34 cannot slide sideways if a pulling force is applied to the locking plate 19, so that the shoe plate 21 is held firmly and without play.

In order to release the camera body again, it is sufficient to press the latch 9 into the baseplate 1, so that pin 11 moves out of groove 8 and into its wedge 5, and the wedge 34 is pushed back by lever 13, allowing the locking plate 19 to be raised by leaf spring 37. The camera body is thus unlocked and can be drawn backwards. Due to the cog 12 being pressed into notch 24 by spring 25, the latch 9 is held in this position until another camera body is mounted and presses trigger pawl 14 forward again.

A camera support of this kind can be used advantageously for a a camera assembly, in particular for a superexpander as described before, which will be explaned now in the following figures.

Figure 6:
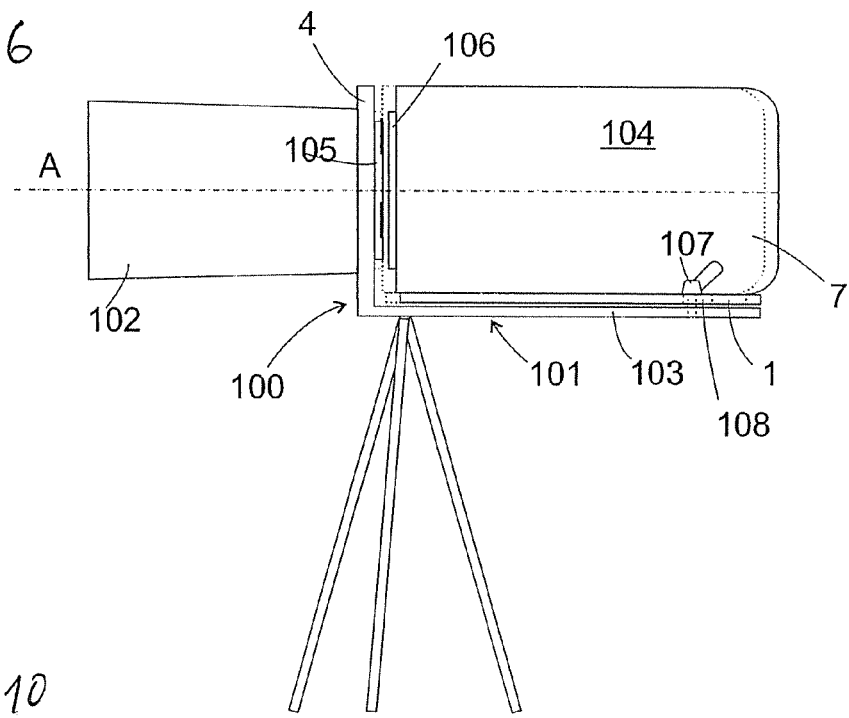
FIG. 6 is a schematic side view of a camera assembly comprising a camera support as shown in FIGS. 1-5.

In the side view of the camera assembly of FIG. 6, reference numeral 100 denotes a camera support having a first, substantially vertical branch 4 and a second, substantially horizontal branch 101. The vertical branch 4 extends perpendicular to the optical axis A of a lens 102 which is mounted to an outer side of branch 4. The horizontal branch 101 comprises a first generally plate-shaped member 103 which is rigidly connected to the vertical branch 4 and is provided with a fixture for fixing it to a tripod or the like, and which is therefore referred to as an immobile member, and a second generally plate-shaped member 1 on which a camera body 104 is mounted. In a first position of the camera body 104 and the second plate-shaped member 1 represented by solid lines in FIG. 6, there is a space between the camera body 104 and the vertical branch 4, and bayonet coupling members 105 and 106 of lens 102 and camera body 104 do not engage. The second plate-shaped member 1 is displaceable into a second position, shown in phantom in FIG. 6, in which coupling members 105 and 106 engage each other and can be locked by rotating one of them, rendering the camera operable. Since the bayonet coupling members 105 and 106 as such are part of the prior art, they are not described in further detail here.

In order to facilitate an understanding of the camera assembly and its operation, to begin with, the second and its connection to the camera body 104 will now be explained in detail referring to FIGS. 7 to 11. The plate-shaped member 1 of FIG. 7 corresponds with the baseplate 1 as explained already with regard to FIGS. 1-5. For same components identical reference numerals are used.

Figure 7:
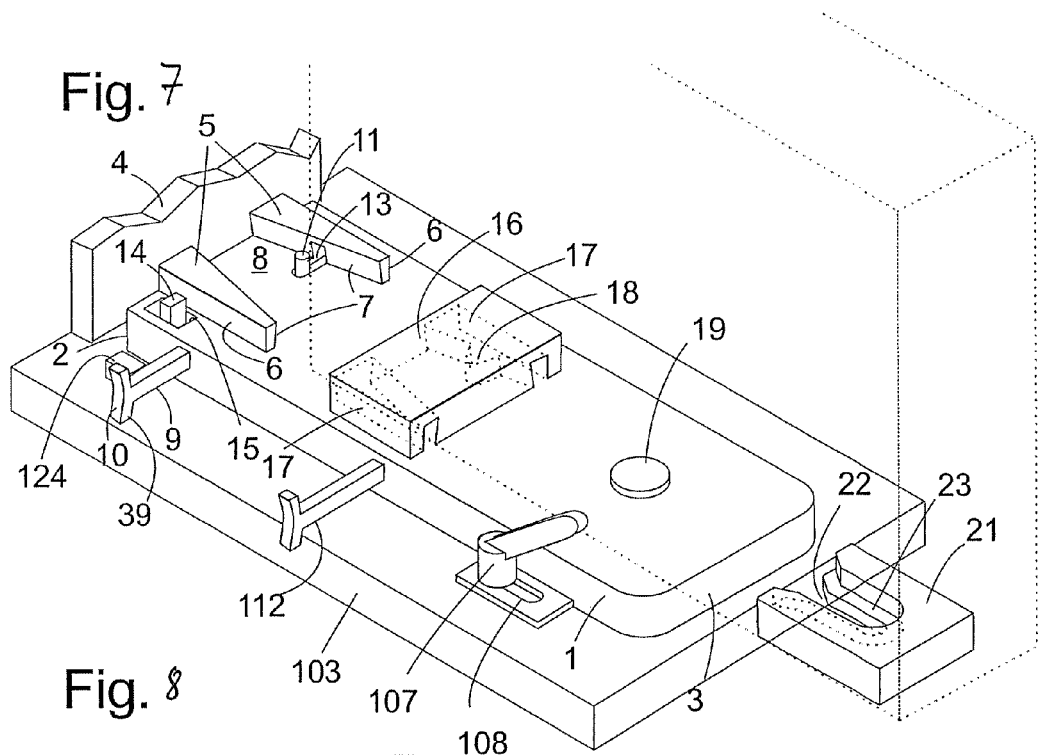
FIG. 7 is a perspective view of a baseplate as shown in FIG. 1, arranged as a displaceable member of the camera assembly of FIG. 6 and of complementary engaging means of the camera for cooperating with the engaging means of the displaceable member.

As shown in FIG. 7, the displaceable member 1 is a flat slab made of aluminum or the like, a front end 2 of which faces the vertical branch 4. Near the front end 2, two wedges 5 are formed on the displaceable member 1. The wedges 5 have vertical outer sides 6 extending in a longitudinal direction of the displaceable member 1 and inner sides 7 which face each other and converge in upward and frontward directions, so as to define a wide tapered groove 8 having a swallow-tail cross section.

Underneath the wedges 5, a latch 9 is slideably received in a transversal slot of the displaceable member 1. At a remote end of the latch 9, a head is formed which has a concave surface 10, which is easily pressed with a finger, in order to push the latch 9 into the displaceable member 1. The head further has a downward-projecting portion 39, which cooperates with a projection 124 of immobile member 103 in a way which will become apparent later in the description. The latch 9 is connected to a cylindrical pin 11 which protrudes through an elongated hole 13 at the bottom of tapered groove 8. The elongated hole 13 extends into one of the wedges 5, so that when the latch 9 is pressed, the pin 11 moves out of the groove 8 and disappears in the opening of the wedge.

Adjacent to the outer side 6 of one of the wedges 5, a trigger pawl 14 is mounted in a hole 15 of the displaceable member 1. The trigger pawl 14 is displaceable in the longitudinal direction of the displaceable member 1.

Near the centre of the displaceable member 1, a cuboid block 16 is shown, which forms engaging means of the camera body 104. The camera body 104 is shown in phantom in FIG. 7 in order to illustrate its position with respect to the block 16. At the bottom side of the block 16, two tapered grooves 17 are formed, the shape of which matches the wedges 5 of the displaceable member 1. Since the grooves 17 have wide openings at the side of the block 16 which faces the wedges 5, it is easy to make the wedges 5 engage the grooves 17 when the camera body 104 is pushed towards the wall 4 in order to prepare for coupling it to the lens 102. The camera body 104 can be pushed forward until an abutment position is reached in which the inner sides of the groove 17 touch the inner sides 7 of the wedges 5. When this happens, a notch 18 formed in an inner side of one of the grooves 17 is aligned with the elongated hole 13, so that pin 11 can engage it and come into contact with a front wall of the notch 18, thereby preventing a rearward movement of the block 16. The block 16 is thus locked to the displaceable member 1 without any play.

Figure 11:
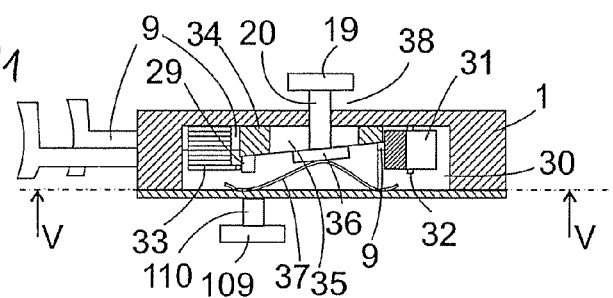
FIG. 11 is a cross section along line VI-VI of FIG. 10.

Near the rear end 3 of the displaceable member 1, a circular locking plate 19 is held spaced from the upper side of the baseplate 1 by a cylindrical stem 20 (see e. g. FIG. 11) which, in the view of FIG. 7, is concealed completely below the locking plate 19.

The camera body 104 has a shoe plate 21 fixed to its rear bottom portion, in which an undercut groove 22 is formed. In its upper portion, the groove 22 is wide enough to receive the locking plate 19, whereas in a lower portion thereof, webs 23 protrude from the sides of the groove towards the centre in order to engage between the locking plate 19 and the surface of the displaceable member 1 at both sides of the stem 20.

In the configuration of the displaceable member 1 shown in FIG. 7, the camera body 104 would be locked to the displaceable member 1, if it was appropriately placed with its block 16 engaging the groove 8, the pin 11 engaging the notch 18 and the locking plate 19 engaging the groove 22 of shoe plate 21.

Figure 10:
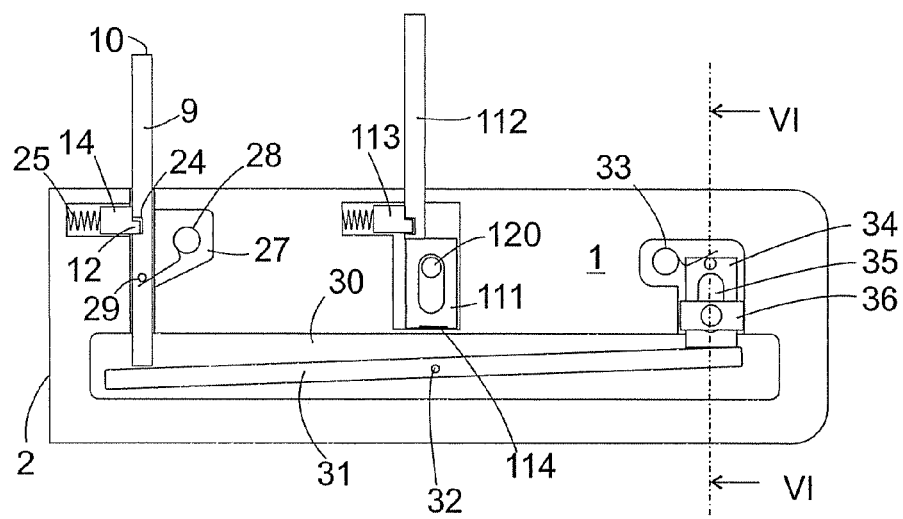
FIG. 10 is a horizontal section of the displaceable member in unlocked configuration along line V-V of FIG. 11.

In order to understand the process of locking the camera body to the displaceable member 1, reference will now be made to FIGS. 9 and 10, which show a bottom view of the displaceable member 1 and a cross section of it in a non-locking configuration. In this configuration, the latch 9 is pressed into the displaceable member 1, so that pin 11 is hidden within the wedge 5. A cog 12, which is part of trigger pawl 14, engages a notch 24 of latch 9. The cog 12 is held pressed into the notch 24 by a compressed helical spring 25. Another helical spring 26 is mounted in a cutout 27 and is under a torsion load, so that an end branch 28 of spring 26 applies a force to a catch 29 of latch 9 which tends to push latch 9 out of the baseplate 1. The latch 9, being blocked by cog 12, cannot yield to this force.

In a longitudinal cutout 30 of the displaceable member 1, a two-armed lever 31 is rotatably held on a shaft 32. A wedge 34 is pressed against one end of the lever 31 by a third helical spring 33, whereby the other end of the lever 31 is pressed against the inner end of latch 9. The wedge 34 has a longitudinal slot 35 formed in it, through which the stem 20 extends. A pressing plate 36 extending across the wedge 34 is fixed to an end of the stem 20. A leaf spring 37, which is not shown in FIG. 10 for the sake of clarity, but in FIG. 11 only, urges the plate 36 against the wedge 34, so that the wedge 34 is held without play between the plate 36 and an inner surface of displaceable member 1. In the configuration of FIG. 11, the space 38 between the upper surface of displaceable member 1 and the bottom side of locking plate 19 is wide enough for the webs 23 of shoe plate 21 to engage in it easily.

In the process of pushing the camera body 104 forward from the position shown in FIG. 7 to the position in which it is to be locked to the displaceable member 1, the block 16 hits trigger pawl 14 and pushes it towards front end 2, whereby spring 25 is compressed and cog 12 is removed from notch 24. Now, the latch 9 can yield to the force of spring 26 and move outward. The lever 31 is now free to rotate about shaft 32, so that it yields to the pressure of the wedge 34, the wedge 34 is moved downward in the perspective of FIG. 10 or to the right in the perspective of FIG. 11, thus pulling locking plate 19 towards displaceable member 1.

Figure 8:
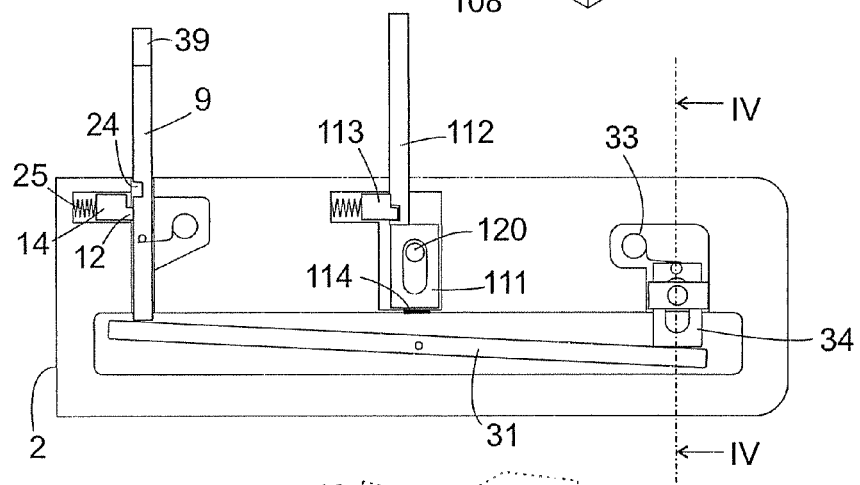
FIG. 8 is a horizontal section of the displaceable member of FIG. 7 along line III-III of FIG. 9.
Figure 9:
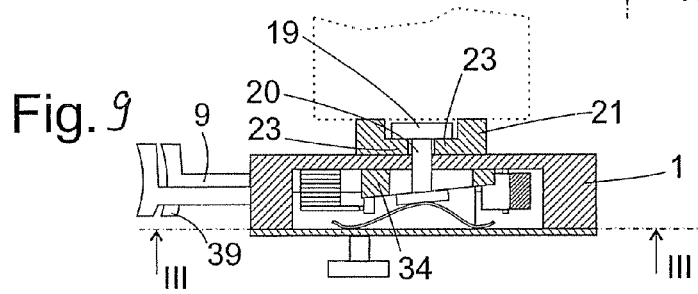
FIG. 9 is a cross section of the displaceable member taken along line IV-IV of FIG. 8.

The resulting configuration can be seen in FIGS. 8 and 9. The wedge 34 yields to the force of spring 33, until the locking plate 19 is drawn so close to the displaceable member 1 that the webs 23 of shoe plate 21 are clamped between displaceable member 1 and locking plate 19. Since the slope of the wedge 34 is small—the thickness difference between its thick and narrow ends may be less than 0.5 mm, whereas the distance between its two positions in the configurations of FIGS. 8 and 10 may be several millimetres—the wedge 34 cannot slide sideways if a pulling force is applied to the locking plate 19, so that the shoe plate 21 is held firmly and without play.

In order to release the camera body again, it is sufficient to press the latch 9 into the displaceable member 1, so that pin 11 moves out of groove 8 and into its wedge 5, and the wedge 34 is pushed back by lever 31, allowing the locking plate 19 to be raised by leaf spring 37. The camera body 104 is thus unlocked and can be drawn backwards. Due to the cog 12 being pressed into notch 24 by spring 25, the latch 9 is held in this position until another camera body is mounted and presses trigger pawl 14 forward again.

Referring to FIG. 7 again, the displaceable member 1 is connected to the immobile member 103 by means of a screw 107 which extends through an elongated hole 108 of displaceable member 1 and engages a threaded bore of immobile member 103.

Other connecting means for connecting and locking the displaceable member 1 to immobile member 103, as shown e.g. in FIG. 11, comprise a locking plate 109 similar to locking plate 19 but held spaced from the bottom side of displaceable member 1 by a stem 110. Similar to stem 20, stem 110 extends through a hole of a wedge 111. The wedge is connected to a latch 112 which extends out of the displaceable member 1. In the configuration of FIGS. 8 and 10, the latch 112 is locked in position by a spring-loaded pawl 113 which engages a notch of latch 112 and thus prevents a spring 114 from expanding and pushing the latch 112 outwards.

Figure 12:
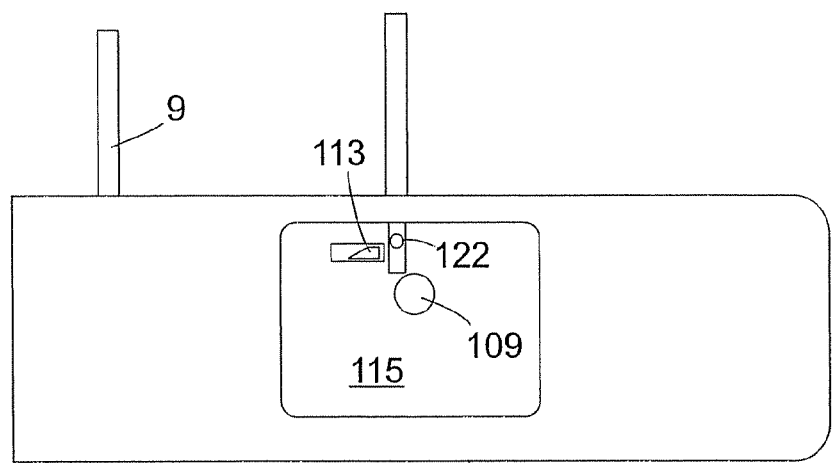
FIG. 12 is a bottom view of the displaceable member.

The bottom view of displaceable member 1 in FIG. 12 shows a shallow recess 115 formed in the bottom side of the displaceable member 1. A trigger portion of pawl 113 extends through an opening at the bottom of the recess 115. By displacing the trigger portion to the left in FIG. 12, the pawl 113 is disengaged from the notch of latch 112; the latch 112 is thrust outward, and the locking plate 109 is drawn towards the bottom side of displaceable member by wedge 111.

A locking pin 122 connected to latch 112 protrudes into recess 115 through a slot which extends in the direction of displacement of latch 112.

Referring to FIGS. 13 to 19, the assembling procedure of the camera assembly is explained.

Figure 13:
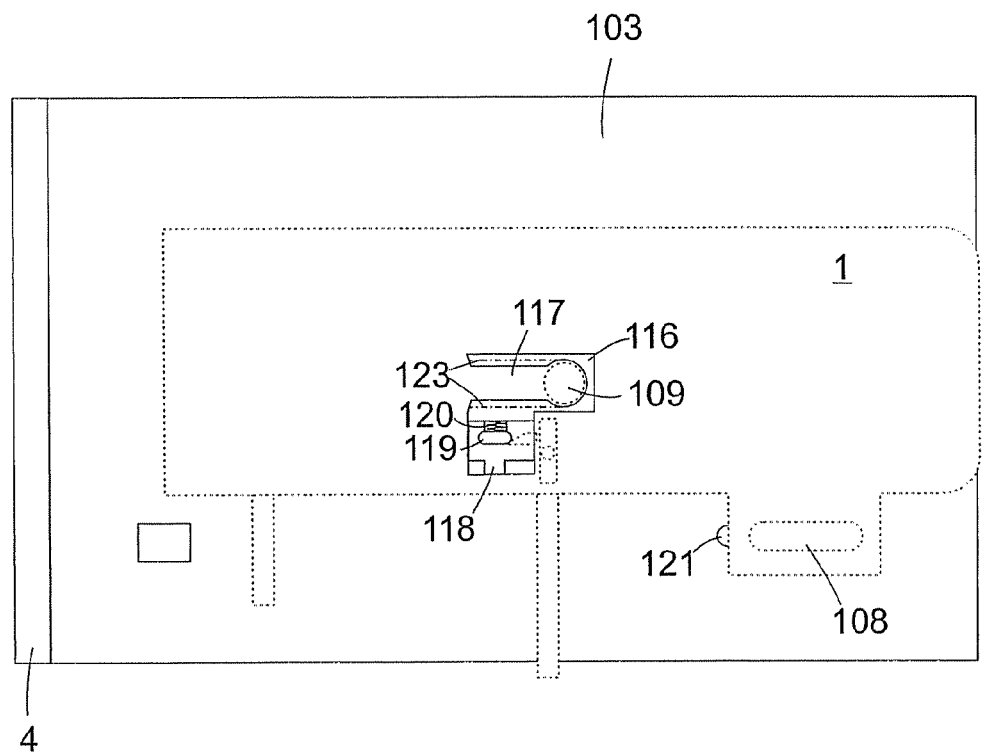
FIGS. 13 to 19 show steps of a mounting procedure of the camera assembly.

FIG. 13 is a top view of the immobile member 103 with the outline of displaceable member 1 shown in phantom. A shoe plate 116 similar to shoe plate 21 of the camera body is fixed to the upper side of immobile member 103. The displaceable member 1 is lying loosely on top of the immobile member 103, and the locking plate 109 of displaceable member 1 is inserted from above into a circular cutout at an end of a groove 117 of shoe plate 116. Undercuts 123 of groove 117 are represented by dash-dot-lines. At a side of shoe plate 116, there is a T-shaped groove 118 from the bottom of which a displaceable block 119 projects upward. The block is urged to a side of immobile member 103 by a compression spring 120. In the configuration of FIG. 13, the screw 107 is removed, and elongated hole 108 does not coincide with the threaded bore 121 of immobile member which the screw 107 is to engage. The camera body is not yet connected to the displaceable member 1. The configuration of FIG. 13 is a service configuration in which the displaceable member 1 can be freely placed on or removed from immobile member 103.

Figure 14:
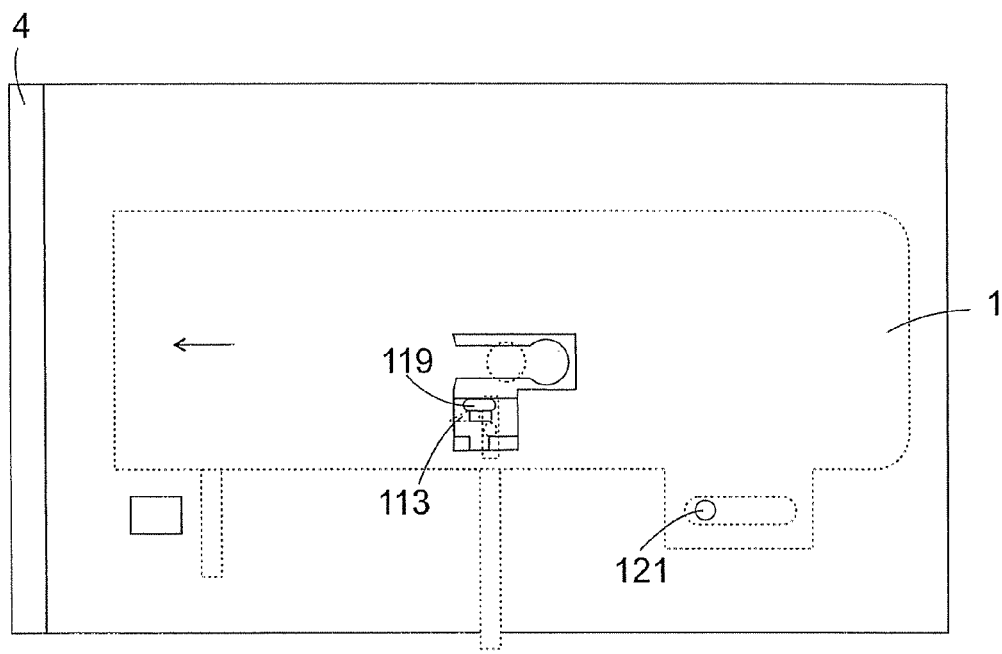

After placing the displaceable member 1 on immobile member 103 in the configuration of FIG. 13, displaceable member 1 is pushed towards the vertical member 4. As can be seen in FIG. 14, the block 119 is displaced against the force of spring 120 by sliding along a tapered side of the trigger portion of pawl 113. The pawl 113 is not displaced by block 119.

Figure 15:
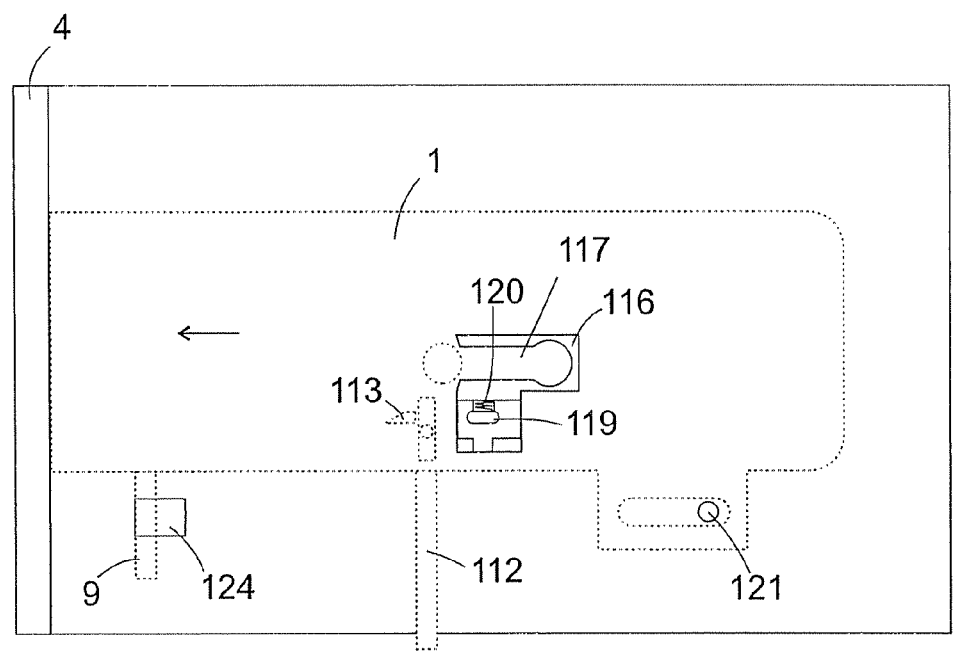

When the displaceable member 1 is pushed still closer to the vertical member 4, as shown in FIG. 15, the block 119 passes pawl 113, and the spring 120 expands again. The locking plate has now reached the other end of groove 117.

Figure 16:
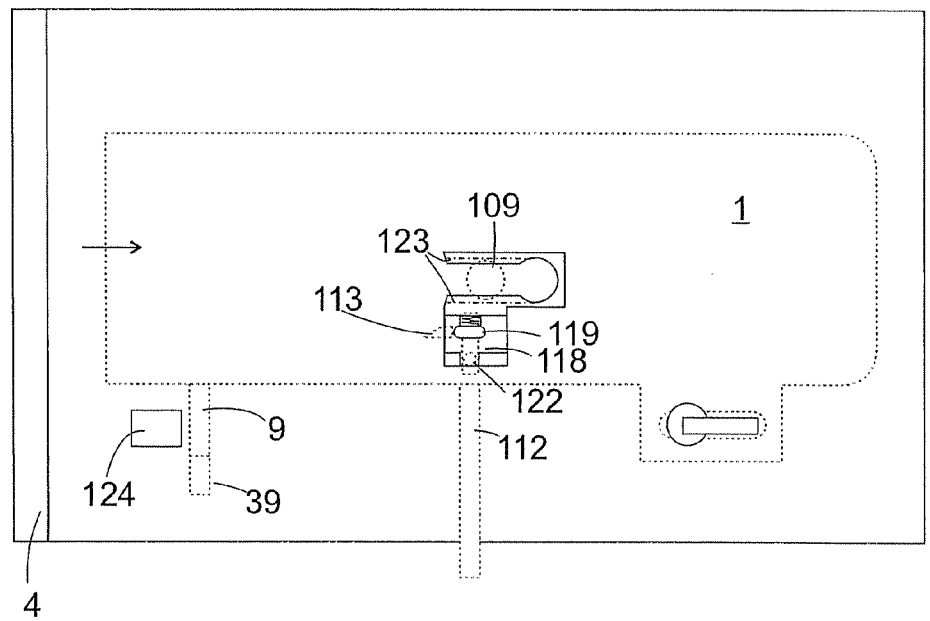

When the displaceable member 1 is drawn away from the vertical member 4 again, block 119 collides with pawl 113 and displaces it, as shown in FIG. 16. This releases latch 112, which is pushed outward. By the action of latch 112 and wedge 111, the locking plate 109 is pulled upward and is pressed against the undercuts 123. Simultaneously, locking pin 122 of latch 112 engages a side branch of T-groove 118, whereby the displaceable member 1 is locked to immobile member 103. In this configuration, the elongated hole 108 coincides with threaded bore 121, and the screw 107 can be inserted, so that displaceable and immobile members cannot separate any more. When the screw 107 is in place, the displaceable member cannot return to the position shown in FIG. 13.

Figure 17:
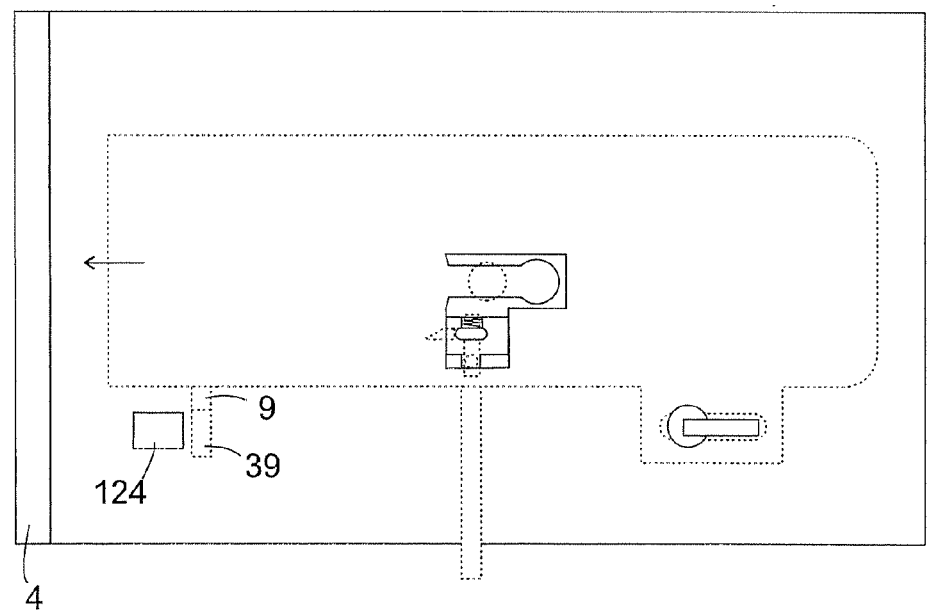

In order to prepare the displaceable member 1 for receiving the camer body 104, in the next step, the latch 9 is pressed into the displaceable member 1, whereby, as explained above, pin 11 is moved out of swallow-tail groove 8, thus clearing the groove 8 for engaging the cuboid block 16 of camera body 104. As shown in FIG. 17, when the latch 9 is pressed in, its downward-projecting portion 39 would abut against projection 124 if the displaceable member 1 was pushed forward. I. e. when the displaceable member 1 is ready for receiving the camera body 104, it cannot be pushed close to the vertical member 4, and an accidental collision of the camera body 104 and the lens 102 is prevented.

Figure 18:
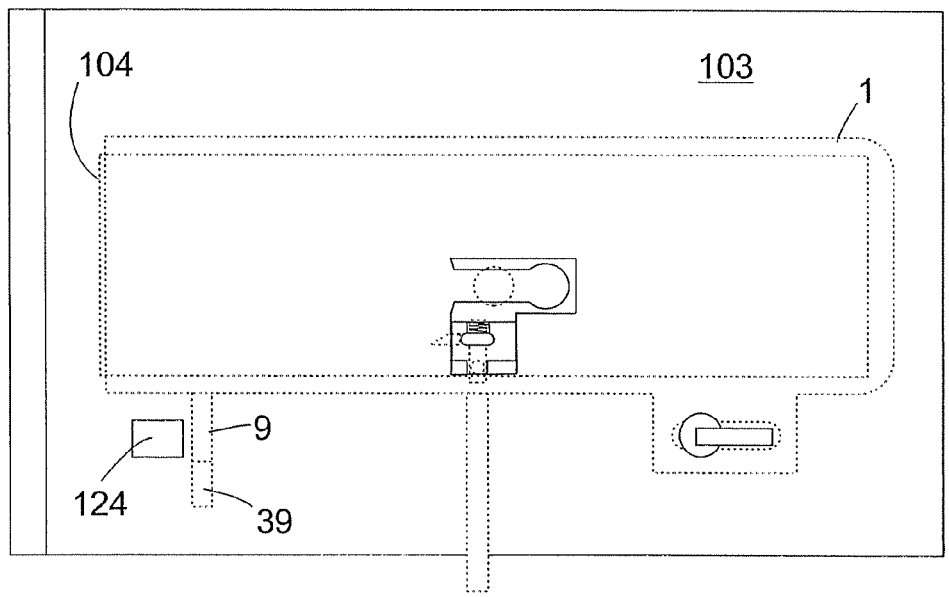

When the camera body 104 is properly locked to the displaceable member 1, as shown in FIG. 18, the latch 9 comes out of the displaceable member 1 again, and the camera assembly is in the first position described above with respect to FIG. 6. The latch 9 does not interfere with projection 124 any more now, but the displaceable member 1 is still locked to the immobile member 103. In this first position, the camera body 104 and the camera support 100 can conveniently be handled as a unit; e.g. they may be removed from a tripod and placed in a storage box together for transport. In this first position, it is further possible to remove the lens 102 from vertical branch 4 without having to fear interference between the lens 102 and the camera body 104 which might damage one or the other.

Figure 19:
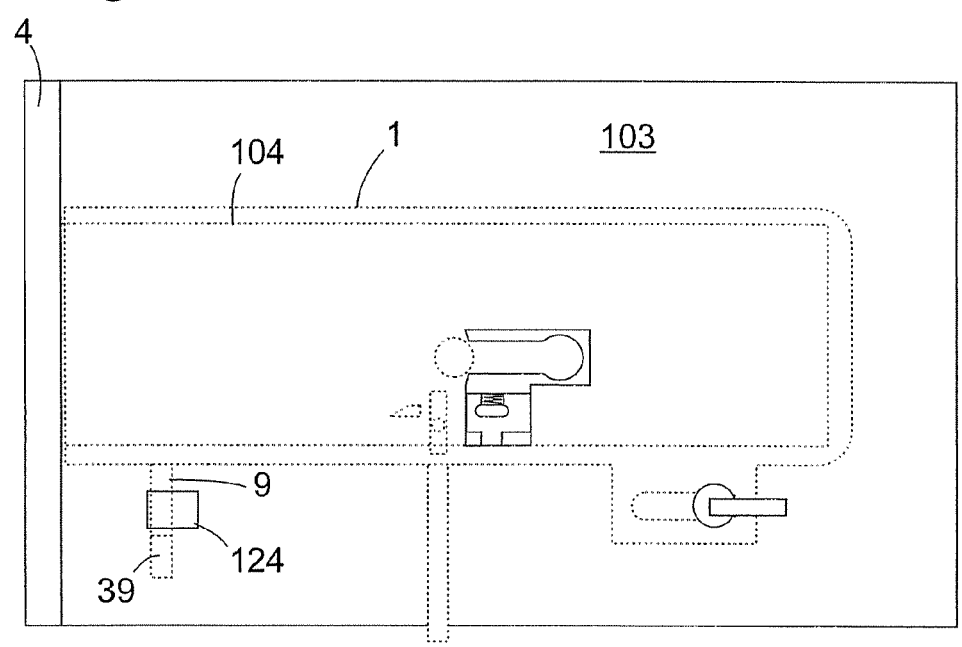

By pressing inward the latch 112, displaceable member 1 is unlocked from immobile member 103, so that the displaceable member 1 and the camera body 104 supported by it can be pushed forward into the position of FIG. 19, in which the camera body 104 is close enough to the lens 102 for the bayonet coupling 105, 106 to be locked. This is the second position mentioned above with respect to FIG. 6. In the configuration of FIG. 19, the projection 124 is below the latch 9, so that the latch 9 cannot be pushed inwards. Thus, it is impossible to unlock the camera body 104 from the displaceable member 1 while the camera body is so close to the lens that an uncontrolled movement of the camera body might cause damage to the lens.

In order to remove the camera body, the stages shown in FIGS. 17 to 19 are gone through in reverse order, i. e. the displaceable member 1 and the camera body 104 are pulled away from vertical member 4 until block 119 triggers pawl 113, the latch 112 is pushed outward and locking plate 109 is pulled upward, clamping shoe plate 116. Then latch 9 is pressed, whereby the camera body 104, now in a safe distance from lens 102, is pushed out of its locking position and can be removed.

Figure 20:
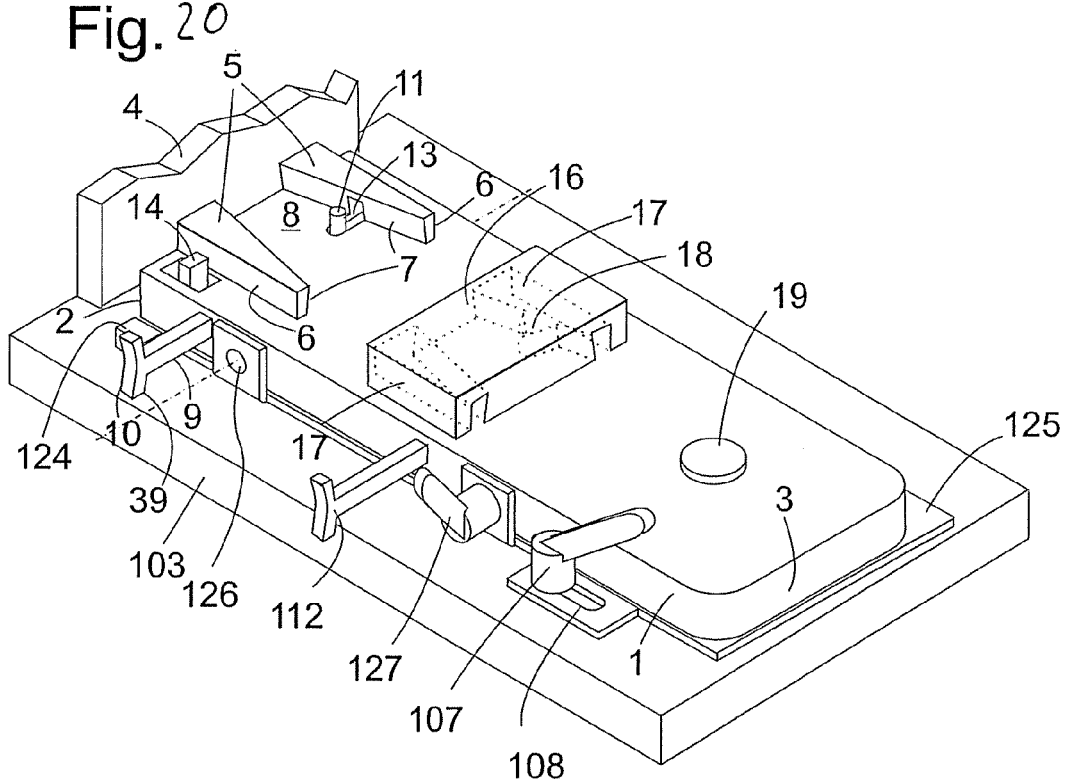
FIG. 20 is a perspective view, analogous to FIG. 7, of a camera support according to a second embodiment of a camera assembly.

FIG. 20 is a perspective view, analogous to FIG. 7, of a camera support according to a second embodiment of the invention. Components of this embodiment which correspond to those of the embodiment of FIG. 7 have identical reference numerals.

The embodiment of FIG. 20 differs from that of FIG. 7 in that the displaceable member 1 does not rest directly on immobile member 103, but there is a plate 125 between the two. Plate 125 rests directly on immobile member 103 and is connected to displaceable member 1 by a shaft 126, allowing the displaceable member 1 to be tilted by a few degrees with respect to the immobile member 103. The plate 125 has a central opening, not shown in the Fig, through which stem 110 extends, allowing the assembly formed of displaceable member 1 and plate 125 to be mounted on immobile member 103 just as described above referring to FIGS. 13 to 19.

A spring is concealed between plate 125 and displaceable member 1 for urging the rear portion of displaceable member 1 upward, compensating the weight of the camera body, so that the tilt of the camera body can be changed with little effort.

A second screw 127 similar to screw 107 is provided for locking the displaceable member 1 with respect to the plate 125 at a desired tilt angle. When the bayonet coupling members 105, 106 are brought into engagement and are locked to each other, the screw 127 may be unlocked, allowing the camera body to yield to any torque that might occur between the bayonet coupling members 105, 106 during locking, so that once the screw 127 is locked again, the assembly is free from internal stress.

The invention claimed is:

1. A camera support comprising a baseplate on which first and second engaging means are formed for releasably engaging first and second portions of a camera body displaced along the baseplate in an engaging direction, wherein
the first engaging means defines an abutment position for the first portion of the camera body, and the second engaging means defines a space between two sidewalls for slidably receiving a web of the camera body,
one of said sidewalls is displaceable towards the other and is coupled to a trigger of the first engaging means so as to clamp the web between the sidewalls, when the trigger is operated by the first portion reaching the abutment position,
a flat outside surface of said baseplate forms one of said sidewalls, and the other sidewall is formed by a locking plate which is held above said flat surface by a stem extending through a bore of said flat surface, and
a wedge is located between a pressing surface of said stem and an inside surface of said baseplate.

2. The camera support of claim 1, comprising a first spring for urging the sidewalls away from each other.

3. The camera support of claim 1, wherein the locking plate-extends from said stem in opposite directions perpendicular to the sliding direction.

4. The camera support of claim 1, wherein the stem extends through a slot of the wedge and the pressing surface is formed on a plate that extends sideways from said stem.

5. The camera support of claim 1, wherein the wedge is urged by a second spring towards a position in which the stem is withdrawn into the baseplate.

6. The camera support of claim 1, wherein the wedge is displaceable transversally with respect to the displacement direction of the camera body, and the trigger releasably engages a spring-loaded latch which is displaceable transversally with respect to said displacement direction, and the wedge is coupled to the latch by a two-armed lever extending in said displacement direction.

7. A camera assembly comprising a camera body and a camera support according to claim 1, wherein the baseplate is arranged as a displaceable member.

8. The camera assembly of claim 7, wherein the camera support-comprises two orthogonal branches, a first of which is adapted to support a lens, and a second of which has first locking means for releasably locking said camera body-to the second branch, said second branch having an immobile member with respect to the first branch, said first locking means being formed in said displaceable member which is displaceable between a first position in which said camera body, when locked to the displaceable member by said first locking means, is spaced from the lens, and a second position in which the camera body connects to the lens.

9. The camera assembly of claim 8, wherein the displaceable member is displaceable into the second position only if the locking means is in a locking configuration.

10. The camera assembly of claim 9, wherein an operating member of said locking means is displaceable perpendicular to the displacement direction of said displaceable member, and wherein the immobile member has a projection which blocks the operating member in its locking configuration when the baseplate is in the second position.

11. The camera assembly of claim 8, wherein the locking means is locked in the locking configuration when the displaceable member is in the second position.

12. The camera assembly of claim 11, wherein an operating member of said locking means is displaceable perpendicular to the displacement direction of said displaceable member, and wherein the immobile member has a projection which blocks the displaceable member in its first position when the locking means is in a non-locking configuration.

13. The camera assembly of claim 8, wherein the displaceable member and the camera body have co-operating guide means for guiding the camera body into a position in which the locking means are capable of locking the camera body to the displaceable member.

14. The camera assembly of claim 13, wherein the guide means are adapted to guide the camera body in the displacement direction of the displaceable member.

15. The camera assembly of claim 8, wherein the displaceable member is displaceable into a third position in which it is farther away from the first branch than in the first and second positions, and in which it is unlocked from the immobile member.

16. The camera assembly of claim 8, wherein second locking means are provided for automatically and releasably locking the displaceable member to the immobile member when the displaceable member is displaced from its first position to its second position.

17. The camera assembly of claim 16, wherein said second locking means comprises an undercut groove formed in one of said members, a locking plate which engages said undercut groove and means for pulling the locking plate towards the other member.

* * * * *